US007120981B2

(12) United States Patent
Huang

(10) Patent No.: US 7,120,981 B2
(45) Date of Patent: Oct. 17, 2006

(54) CRANK ARM REMOVER FOR A BICYCLE

(76) Inventor: Hung-Chen Huang, No. 12, Lane 802, Feng-Luen Rd., Pyi-Tour Country, Chang Hwa Hsien (TW)

( * ) Notice: Subject to any disclaimer, the term of this patent is extended or adjusted under 35 U.S.C. 154(b) by 82 days.

(21) Appl. No.: 10/950,752

(22) Filed: Sep. 27, 2004

(65) Prior Publication Data

US 2005/0257357 A1 Nov. 24, 2005

(30) Foreign Application Priority Data

May 18, 2004 (TW) .............................. 93207699 U

(51) Int. Cl.
*B23P 19/04* (2006.01)

(52) U.S. Cl. ........................................................ 29/264

(58) Field of Classification Search .................. 29/263, 29/264

See application file for complete search history.

(56) References Cited

U.S. PATENT DOCUMENTS 5,519,929 A * 5/1996 Bleckman .................... 29/264

* cited by examiner

*Primary Examiner*—Robert C. Watson
(74) *Attorney, Agent, or Firm*—Charles E. Baxley

(57) ABSTRACT

The present invention relates to a crank arm remover for a bicycle, which includes a screw bolt and a threaded sleeve. The screw bolt is provided at an end with a corner portion which is to be pushed by a grip handle, another end of the screw bolt is provided with an abutting block. The threaded sleeve is screwed on the screw bolt. The characteristics of this present invention are that the abutting block has more than one layer of abutting portion, and the respective layers of abutting portion have different sizes. By such arrangements, this crank arm remover will be operable to assemble and disassemble the crank arm of different sizes.

4 Claims, 10 Drawing Sheets

CRANK ARM REMOVER FOR A BICYCLE

BACKGROUND OF THE INVENTION

1. Field of the Invention

The present invention relates to a crank arm remover for a bicycle, and more particularly to a crank arm remover for a bicycle that is applicable to at least two different types of crank arm of a bicycle.

2. Description of the Prior Arts

Referring to FIG. 1, a conventional crank arm remover for a bicycle generally comprises a screw bolt 11 and a threaded sleeve 12. At an end of the screw bolt 11 is provided a corner portion 111 which is to be rotated and engaged by a grip handle 13. Another end of the screw bolt 11 is formed with an abutting block 112. The threaded sleeve 12 is provided on its outer surface with plural threads 121. The threaded sleeve is moveably installed on the screw blot 11 and located between the corner portion 111 and the abutting block 112. As shown in FIG. 2, to remove a crank arm of a bicycle, the user can start by screwing the threads 121 of the threaded sleeve 12 in a threaded hole 211 of the crank arm 21 and engaging the grip handle 13 with the corner portion 111 of the screw bolt 11, at this moment, the threaded sleeve 12 and the crank arm 21 are locked with each other, and then pushing the grip handle 13 so as to make the screw bolt 11 move toward the central rotation axis 22 until the abutting block 112 of the screw bolt 11 pushes against the central rotation axis 22. Thus causing the crank arm 21 to be pushed by the threaded sleeve 12 to move backward and finally disengage from the central rotation axis 22. However, this crank arm remover still has some disadvantages in real operation:

The threaded sleeve 12 needs to be locked with the crank arm 21 if want to remove the crank arm 21, and the abutting block 112 of the screw bolt 11 needs to move to and push against the end surface of the central rotation axis 22. However, there is another type of crank arm that the central rotation axis 22 and the crank arm 21 are screwed with each other, as shown in FIG. 3. This type of central rotation axis 22 and the crank arm 21 cannot be pushed by the abutting block 112 of the screw bolt 11 (namely, an axial hole 221 of the central rotation axis 22 is larger than the abutting block 112 of the screw blot 11), it needs to use another type crank arm remover to remove the crank arm, thus, the conventional crank arm remover for a bicycle is not so practical.

The present invention has arisen to mitigate and/or obviate the afore-described disadvantages.

SUMMARY OF THE INVENTION

The primary object of the present invention is to provide a crank arm remover for a bicycle which is applicable to at least two different types of crank arm of a bicycle.

A crank arm remover for a bicycle in accordance with the present invention comprises:

a screw bolt, at an end of which is formed a corner portion employed to be engaged and rotated by a grip handle, at another end of the screw bolt is pivotally disposed an abutting block;

a threaded sleeve is moveably installed on the screw bolt;

wherein the abutting block includes a first abutting portion and a second abutting portion, the first abutting portion projects from a central part of an abutting surface of the second abutting portion, and an abutting surface of the first abutting portion is smaller than that of the second abutting portion, thus, the crank arm remover for a bicycle is applicable to at least two different types of crank arm.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
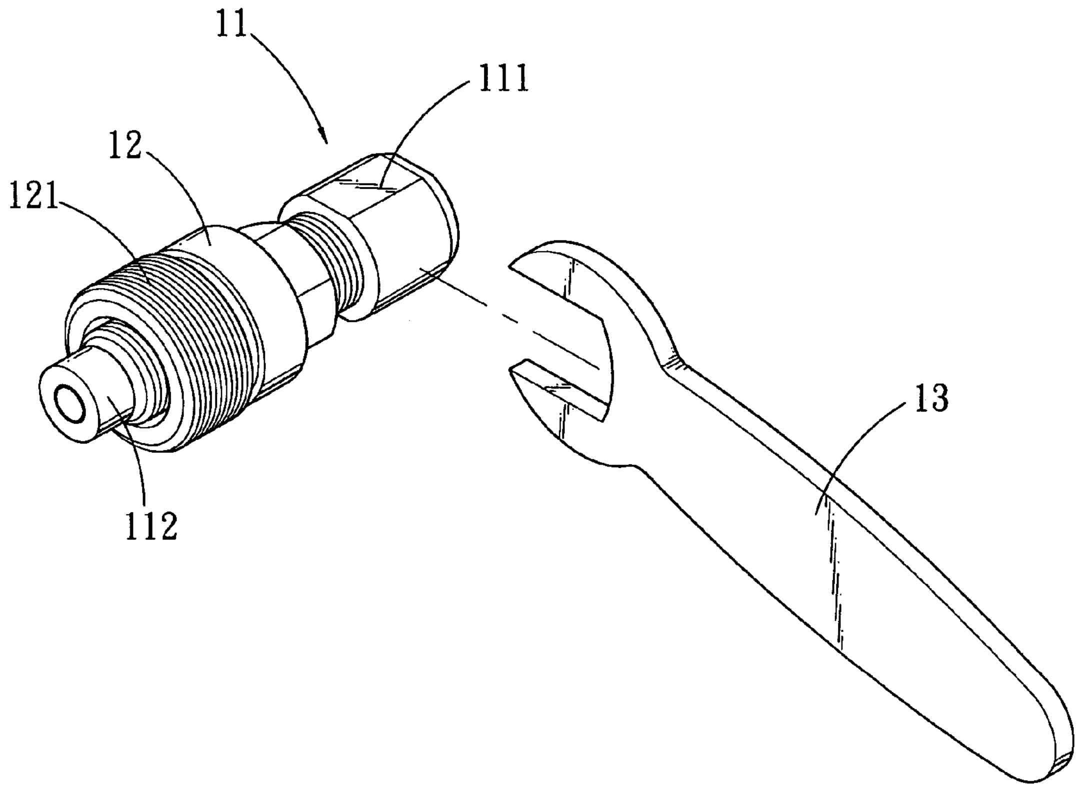
FIG. 1 PRIOR ART
FIG. 1 is an exploded view of a conventional crank arm remover for a bicycle.
Figure 2:
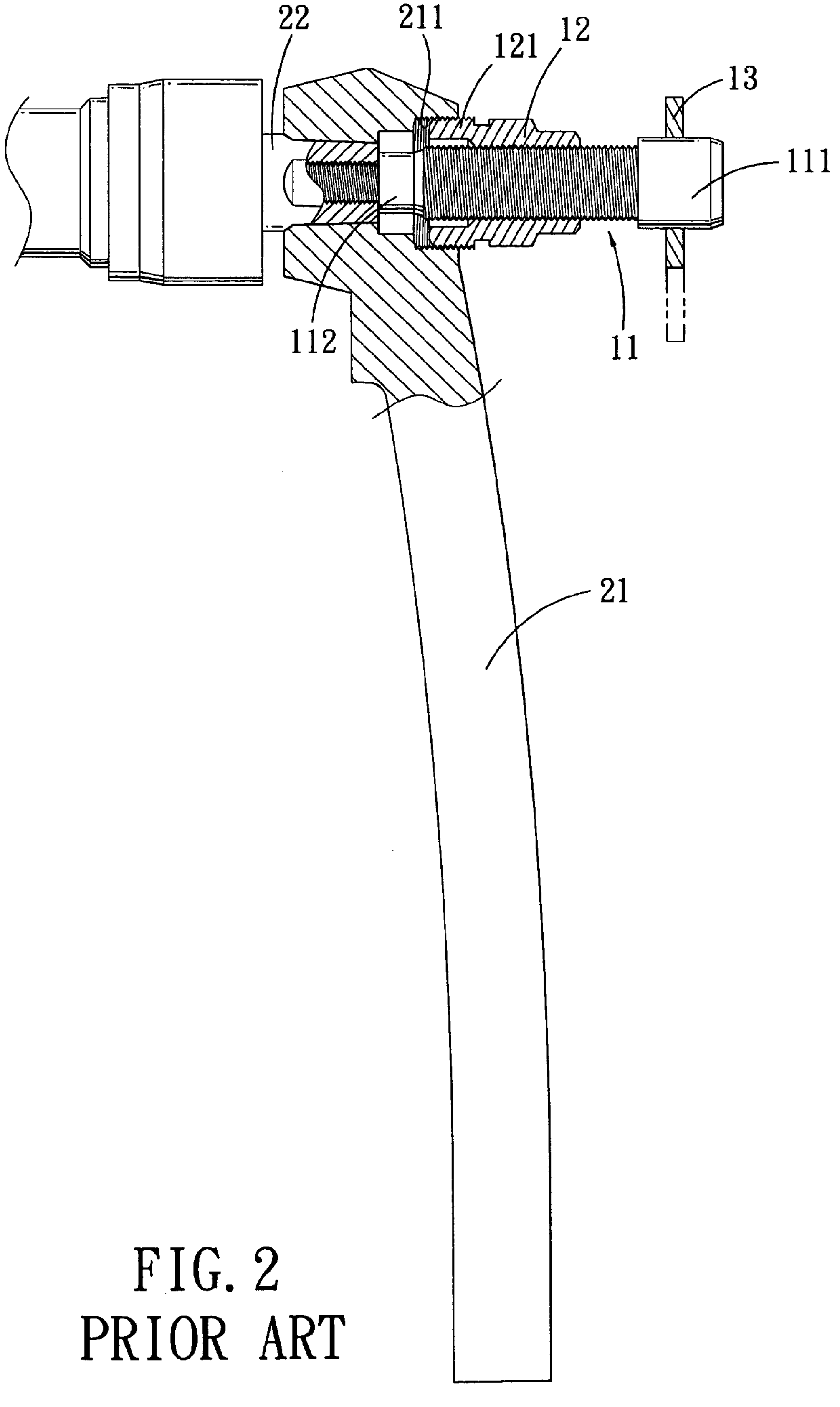
FIG. 2 PRIOR ART
FIG. 2 is a cross sectional view of showing a first type crank arm of a bicycle.
Figure 3:
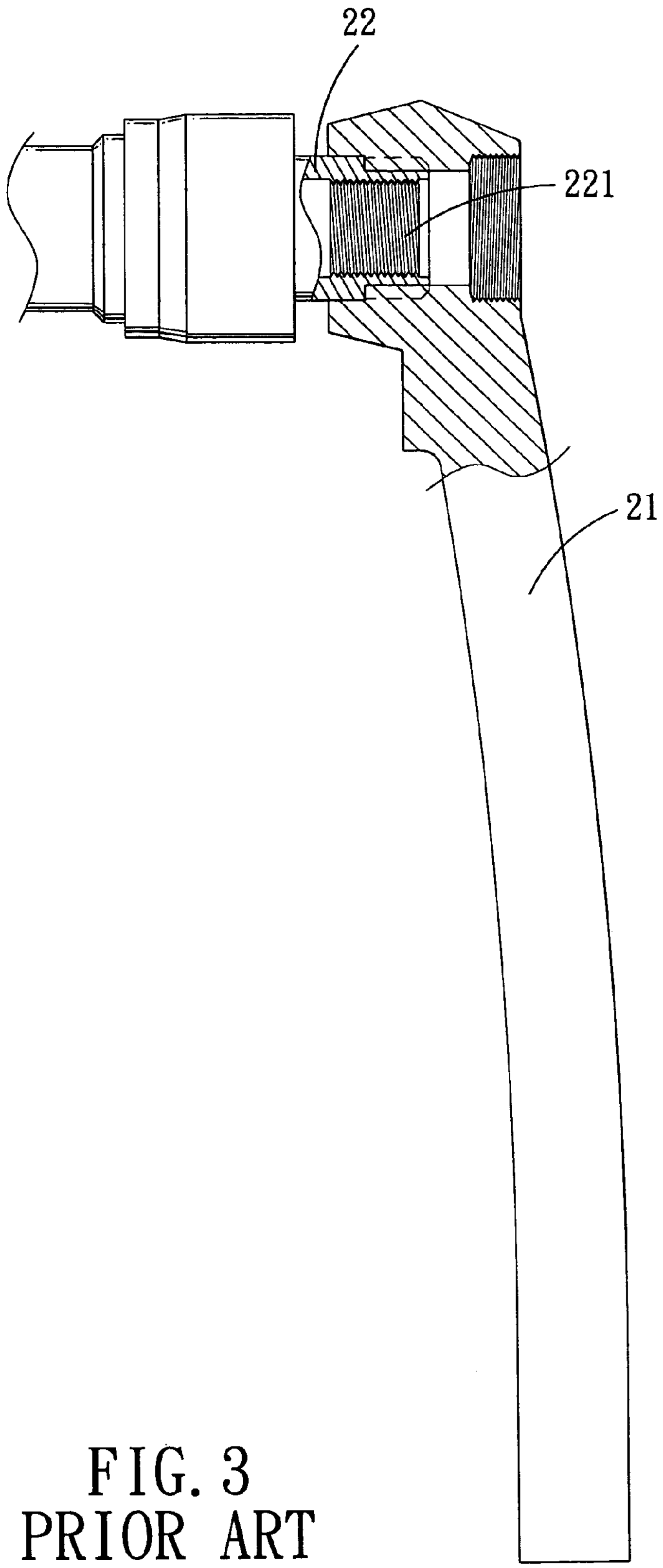
FIG. 3 PRIOR ART
FIG. 3 is a cross sectional view of showing a second type crank arm of a bicycle.
Figure 4:
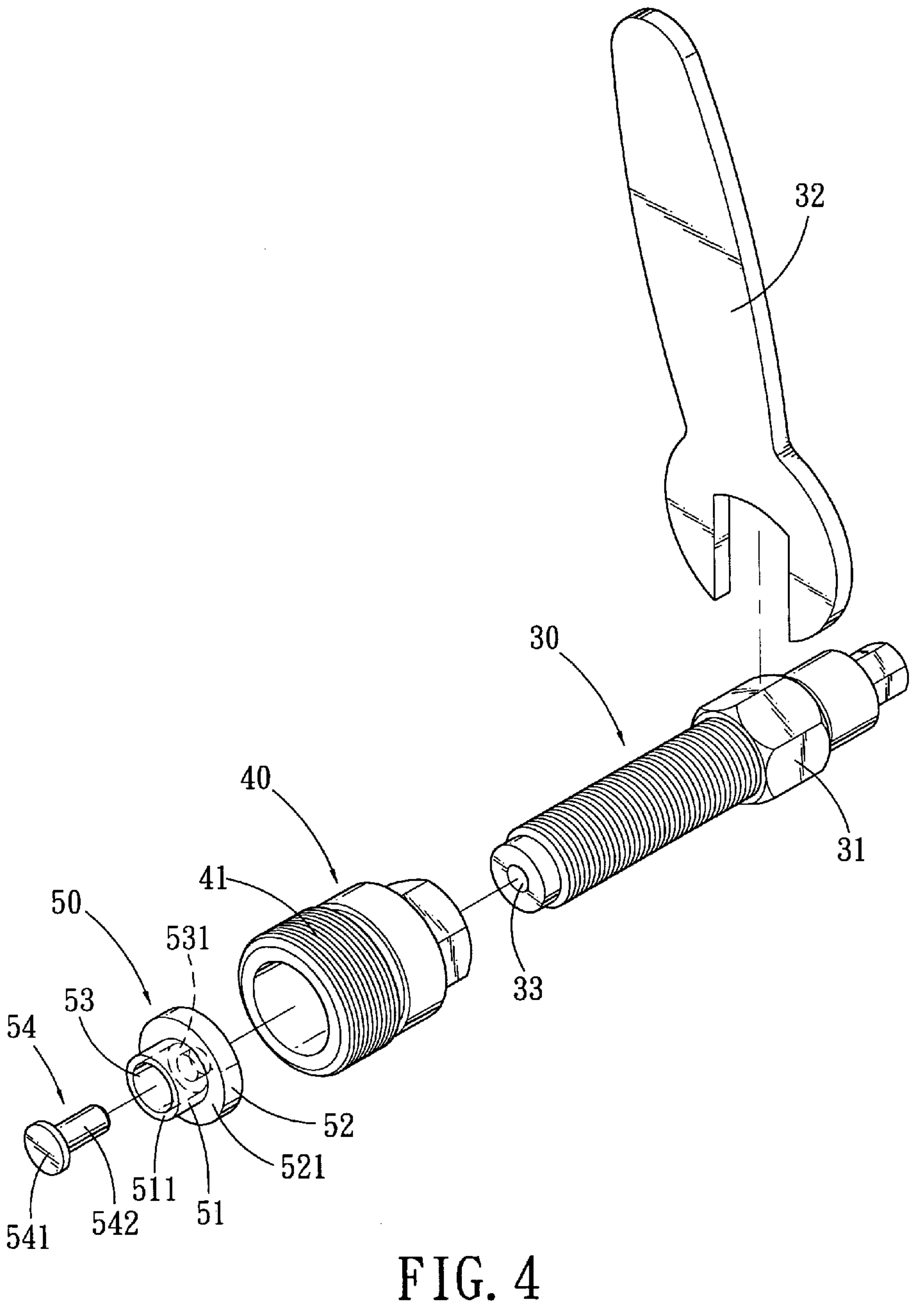
FIG. 4 is an exploded view of a crank arm remover for a bicycle in accordance with a first embodiment of the present invention.
Figure 5:
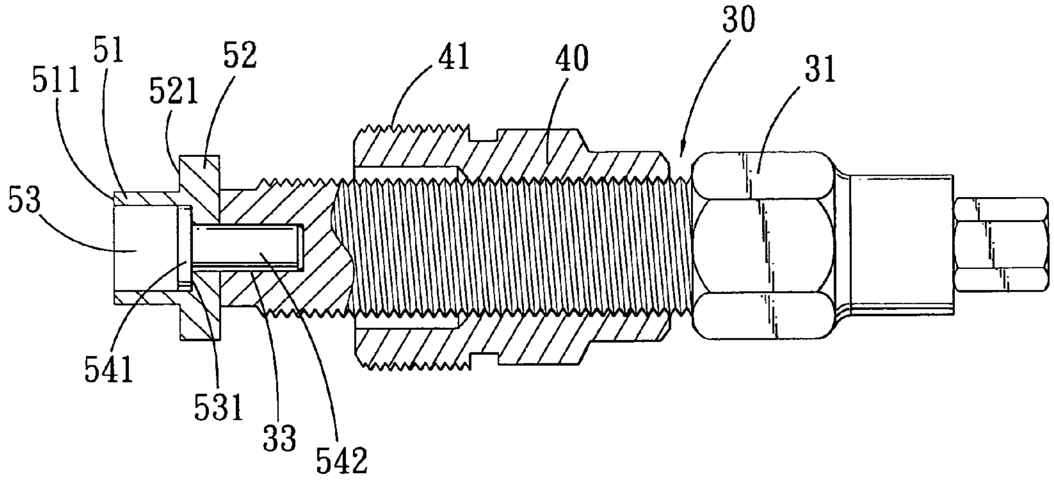
FIG. 5 is an assembly cross sectional view a crank arm remover for a bicycle in accordance with the first embodiment of the present invention.

Referring to FIGS. 4 and 5, a crank arm remover for a bicycle in accordance with the present invention comprises: a screw bolt 30, a threaded sleeve 40 and an abutting block 50.

At an end of the screw bolt 30 is formed a hexagonal-shaped corner portion 31 which is to be engaged and rotated by a grip handle 32, at another end of the screw bolt 30 is defined a groove 33.

The threaded sleeve 40 is provided at its outer surface with plural threads 41 for meshing with the screw bolt 30.

The abutting block 50 includes a first stepped abutting portion 51 and a second stepped abutting portion 52. The first stepped abutting portion 51 projects from the center of an abutting surface 521 of the second stepped abutting portion 52, an abutting surface 511 of the first stepped abutting portion 51 is smaller than the abutting surface 521 of the second stepped abutting portion 52. Furthermore, an axial hole 53 passing through the first and the second stepped abutting portions 51,52 is interiorly provided with a pivot 54 having a head portion 541 which rests against the shoulder portion 531 of the axial hole 53. The body portion 542 of the pivot 54 is inserted in the groove 33 of the screw bolt 30 after passing through the axial hole 53. Thus, the abutting block 50 is pivotally disposed at the second end of the screw bolt 30.

Figure 6:
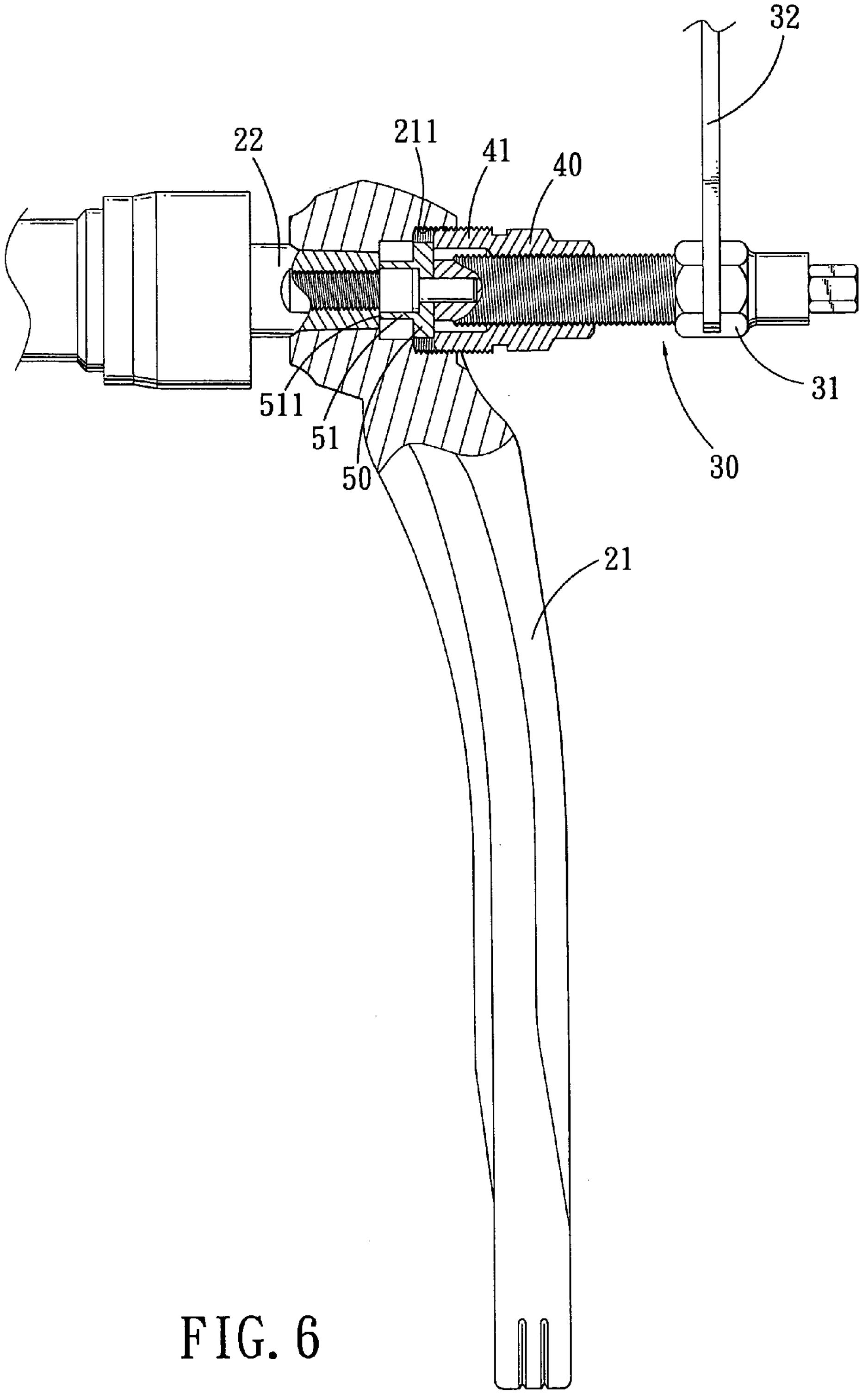
FIG. 6 is a cross sectional view of showing the crank arm remover of the first embodiment is being used to remove the first type crank arm.
Figure 7:
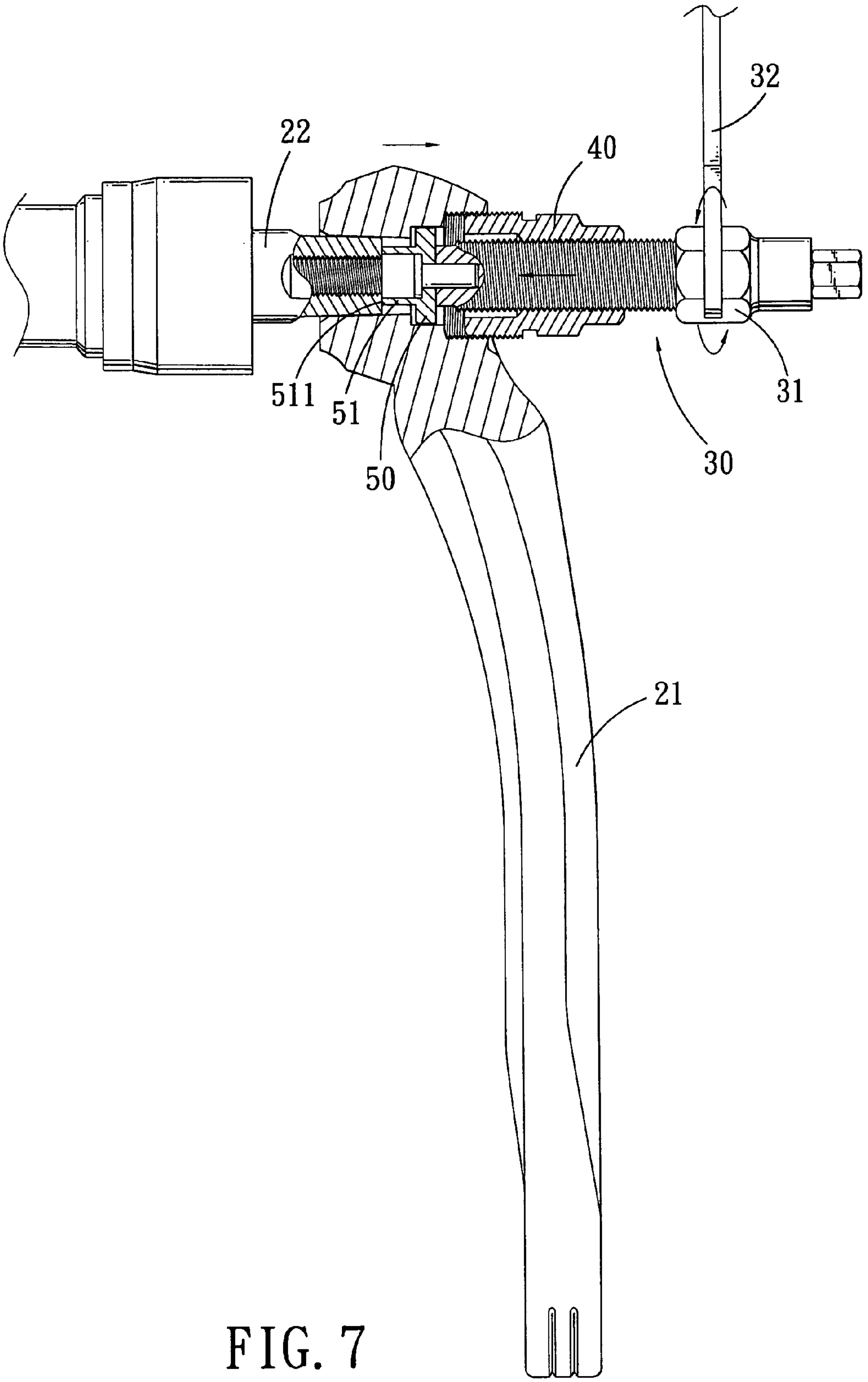
FIG. 7 is an operational cross sectional view of showing the crank arm remover of the first embodiment is being used to remove the first type crank arm.

Referring to FIGS. 6 and 7, after the threads 41 of the threaded sleeve 40 are screwed in the threaded hole 211 of the crank arm 21, the user can rotate the corner portion 31 of the screw bolt 30 with the grip handle 32, thus moving the abutting block 50 toward the central rotation axis 22 until the first abutting surface 511 of the first stepped abutting portion 51 abuts against the end surface of the central rotation axis 22. Thus, the crank arm 21 will be pushed by the threaded sleeve 40 to disengage the central rotation axis 22.

Figure 8:
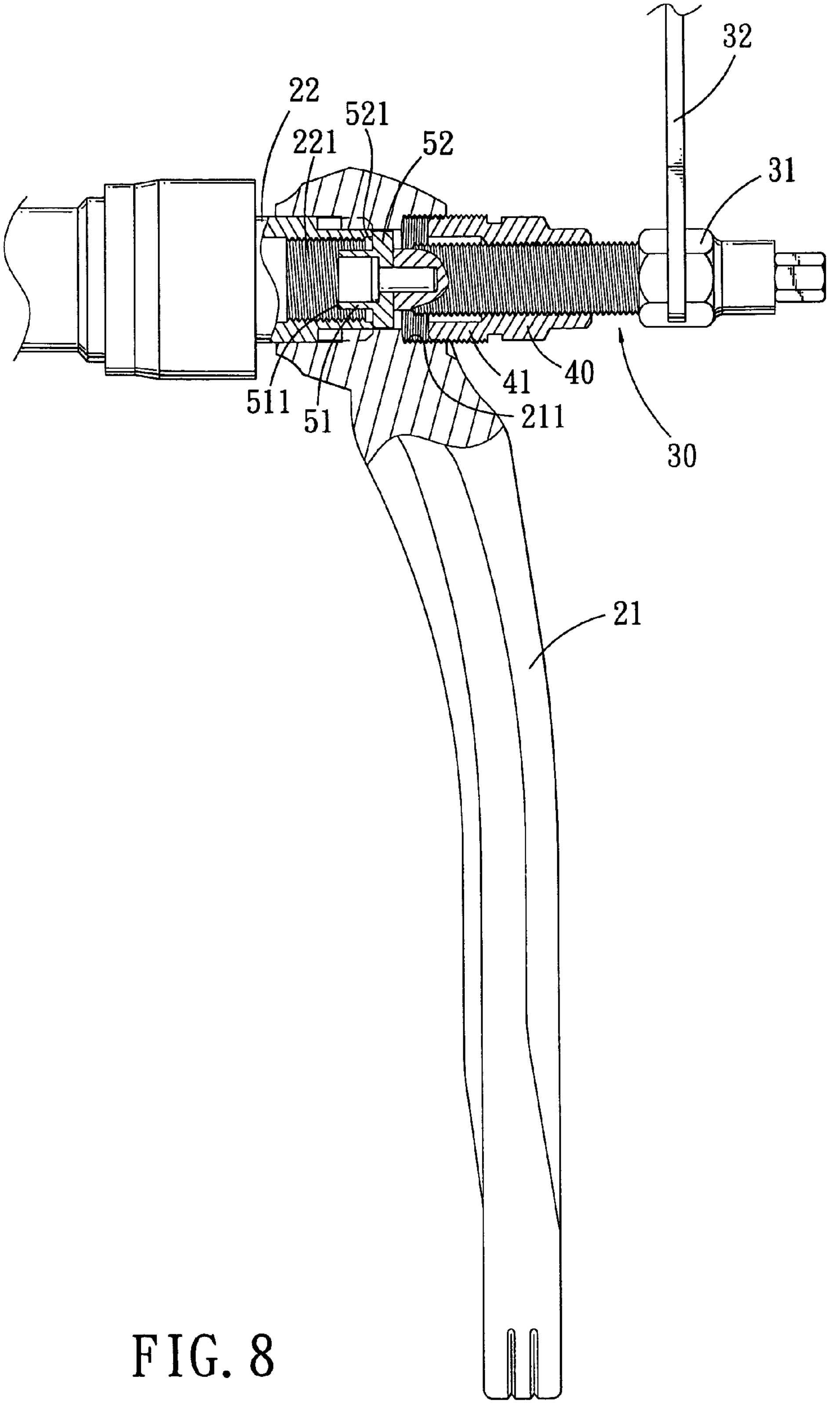
FIG. 8 is a cross sectional view of showing the crank arm remover of the first embodiment is being used to remove the second type crank arm.
Figure 9:
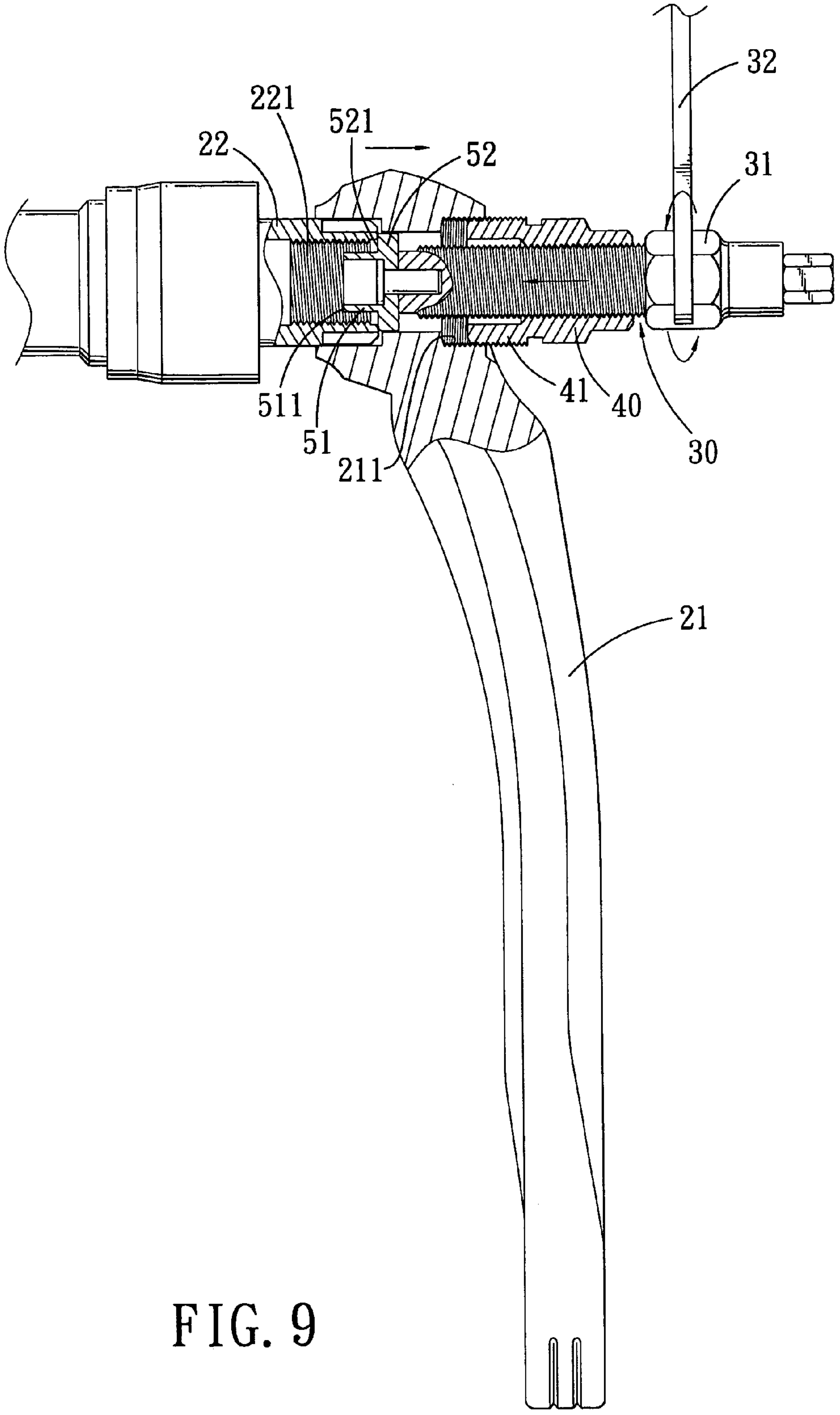
FIG. 9 is an operational cross sectional view of showing the crank arm remover of the first embodiment is being used to remove the second type crank arm.

Referring to FIGS. 8 and 9, which show another type of central rotation axis 22 and crank arm 21, wherein the central rotation axis 22 are screwed with the crank arm 21. An axial hole 221 of the central rotation axis 22 is larger than the abutting surface 511 of the first abutting portion 51 of the abutting block 50. To remove the crank arm 21, the user also screws the threads 41 of the threaded sleeve 40 in the threaded hole 211 of the crank arm 21, and then rotates the corner portion 31 of the screw bolt 30 with the grip handle 32, thus pushing the abutting block 50 to move toward the central rotation axis 22. At this movement, the first abutting portion 51 will move in the axial hole 221 of the central rotation axis 22 until the abutting surface 521 of the second abutting portion 52 of the abutting block 50 abuts against the end surface of the central rotation axis 22. Thus, the crank arm 21 will be caused to move opposite to the threaded sleeve 40 and finally disengage from the central rotation axis 22.

Thereby, the present invention is improved in applicability since it is applicable to the two different types of crank arms of a bicycle. Besides, the abutting block 50 in accordance with the present invention can be provided with multiple layers of abutting portion, and the abutting surfaces of the respective layers of abutting portion are different in size. Thus, it can be applicable to multiple types of crank arm and central rotation axis.

Figure 10:
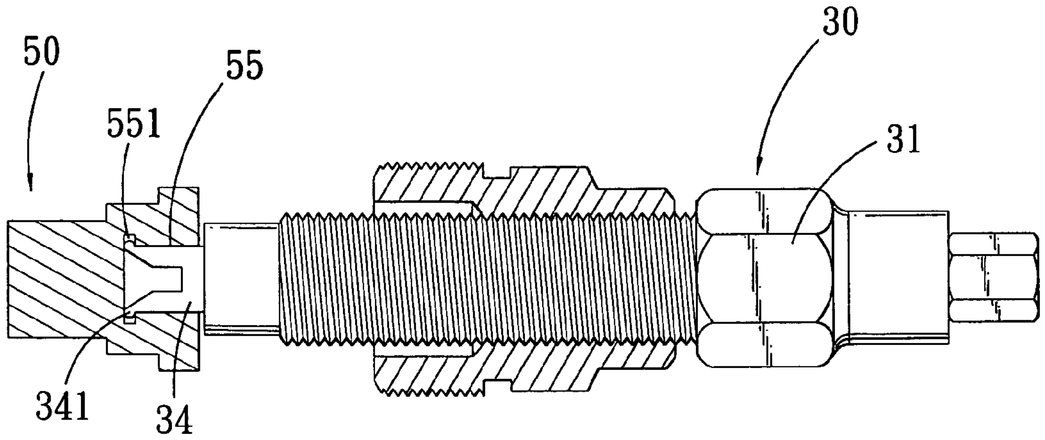
FIG. 10 is an assembly cross sectional view of a crank arm remover of a bicycle in accordance with a second embodiment of the present invention.

Referring to FIG. 10, a crank arm remover in accordance with a second preferred embodiment of the present invention generally comprises: a screw bolt 30, a threaded sleeve 40 and an abutting block 50. Its structure and operating manner are identical to the crank arm remover of the first embodiment, so further explanations will be omitted here, and only the differences are explained as follows:

At an end of the screw bolt 30 opposite to the corner portion 31 is formed a pivot portion 34 whose terminal end is provided with a flange 341. The pivot portion 34 is hollow and slightly deformable after compression. The abutting block 50 includes three layers of abutting portion, and the abutting-surfaces of the respective layers of abutting portion are different in size. Furthermore, the abutting block 50 is axially defined with a flute 551 which is provided on its sidewall with a cavity 551. Thus, the abutting block 50 can be pivotally installed on the screw bolt 30 by special means in such a manner that the flange 341 is engaged in the flute 551.

While we have shown and described various embodiments in accordance with the present invention, it should be clear to those skilled in the art that further embodiments may be made without departing from the scope of the present invention.

What is claimed is:

1. A crank arm remover for a bicycle comprising:

a screw bolt, at an end of which formed a corner portion employed to be engaged and rotated by a grip handle, at another end of which pivotally disposed an abutting block;

a threaded sleeve moveably installed on the screw bolt;

wherein the abutting block includes a first abutting portion and a second abutting portion, the first abutting portion projects from a central part of an abutting surface of the second abutting portion, and an abutting surface of the first abutting portion is smaller than that of the second abutting portion, thus, the crank arm remover for a bicycle is applicable to at least two different types of crank arm;

a groove is formed at the end of the screw bolt, the abutting block is formed with an axial hole, and the abutting block is pivotally installed on the screw bolt by inserting a pivot through the axial hole of the abutting block and into the groove of the screw bolt.

2. The crank arm remover for a bicycle as claimed in claim 1, wherein a pivot portion is formed at the end of the screw bolt opposite to the corner portion, at a terminal end of the pivot portion is formed a flange, the abutting block is axially formed with a flute, a cavity is formed on an inner sidewall of the flute, the abutting block is pivotally installed on the screw bolt in such a manner that the flange is engaged in the flute.

3. The crank arm remover for a bicycle as claimed in claim 2, wherein the pivot portion of the screw bolt is hollow and deformable under compression.

4. The crank arm remover for a bicycle as claimed in claim 3, wherein the abutting block includes three layers of abutting portion whose abutting surfaces are different in size.

* * * * *